(12) United States Patent
Katougi (10) Patent No.: US 6,791,055 B1
(45) Date of Patent: Sep. 14, 2004

(54) METHOD AND APPARATUS FOR ELECTRODISCHARGE MACHINING

(75) Inventor: Hidetaka Katougi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/258,118

(22) PCT Filed: Apr. 20, 2000

(86) PCT No.: PCT/JP00/02590

§ 371 (c)(1),
(2), (4) Date: Oct. 21, 2002

(87) PCT Pub. No.: WO01/81035

PCT Pub. Date: Nov. 1, 2001

(51) Int. Cl.[7] .............................. B23H 1/00; B23H 7/20
(52) U.S. Cl. ................. 219/69.17; 219/69.13; 700/162
(58) Field of Search .................... 219/69.13, 69.17; 700/162

(56) References Cited

U.S. PATENT DOCUMENTS 5,224,048 A * 6/1993 Ohba et al. ............... 700/162
6,556,886 B1 * 4/2003 Riva et al. ................ 700/162

FOREIGN PATENT DOCUMENTS

| JP | 2-218517 | | 8/1990 | |
|----|----------|---|--------|---|
| JP | 3-178731 | | 8/1991 | |
| JP | 3-178731 A | * | 8/1991 | ............ 219/69.13 |
| JP | 5-169348 A | * | 7/1993 | |
| JP | 11-226819 A | * | 8/1999 | |

* cited by examiner

Primary Examiner—Geoffrey S. Evans
(74) Attorney, Agent, or Firm—Sughrue Mion, PLLC (57) ABSTRACT

An electric discharge machining apparatus having: a machining condition storage device (13) including a machining condition database in which machining condition data are stored; an input-output device (14) for reading either of shape data of a tool electrode (9) and machining shape data of a subject (W) for machining; a shape computing device (15) for extracting a plurality of sections from the shape data, mesh-dividing the sections into split elements, giving mesh data of solidness or hollowness and extracting machining shape characteristic from the mesh data; and a machining condition setting device (12) for selecting a machining condition while making the machining shape characteristic correspond to machining condition data in the machining condition database of the machining condition storage device (13). Even when the machining shape is complex, more efficient machining can be performed because an appropriate machining condition can be set.

5 Claims, 6 Drawing Sheets

CONCAVE PORTION

FIG. 3B

CONVEX PORTION

METHOD AND APPARATUS FOR ELECTRODISCHARGE MACHINING

TECHNICAL FIELD

The present invention relates to improvement in electric discharge machining method and apparatus in which a machining condition can be set by use of graphic data of a tool electrode or a subject for machining generated by CAD or the like.

BACKGROUND ART

In electric discharge machining, a machining condition, an oscillating condition, etc. to be set are determined in accordance with the shape of a tool electrode and electric discharge energy at the time of machining. For example, a high-energy machining condition is used in rough machining and a low-energy machining condition is used in final machining for selecting an oscillating condition to make the shape of a subject for machining analogous to the shape of the tool electrode in accordance with the target machining shape of the subject.

The machining condition used in rough machining is determined in accordance with the expected shape of the subject, the depth of machining, the number of tool electrodes used in machining and the scaling-down margin as the downsizing quantity for the final shape and the tool electrode. The machining condition used in final machining is determined in accordance with target accuracy in the final machining shape of the subject, surface roughness and the degree of abrasion of the tool electrode. With respect to the oscillating condition, the relative movement between the tool electrode and the subject is controlled to obtain quadrilateral or polygonal oscillation when angularity of the final machining shape of the subject is regarded as important, and the relative movement between the tool electrode and the subject is controlled to obtain circular-arc, elliptic or spherical oscillation when the final machining shape of the subject has roundness.

Further, in the case where the area of machining at an initial stage of machining is so small that abrasion of the tool electrode becomes intensive when machining is performed under a rough machining condition, control, so-called lead-in control is performed so that machining is started under a low-energy machining condition before the machining condition is gradually changed to an original rough machining condition. Further, adaptive control or the like for discharge interrupt time, jump motion, etc. is performed.

In this manner, lots of machining conditions must be set for electric discharge machining. Moreover, these machining conditions strongly depend on the shape of the tool electrode and the aimed machining content. Hence, technical skill is required for setting the machining conditions.

To solve this problem, Japanese Patent Laid-Open No. 218517/1990 has disclosed an electric discharge machining method and apparatus in which an operating person inputs information concerning materials of a tool electrode and a subject for machining to be used, maximum machining area at the time of rough machining and surface roughness at final machining so that optimal electrical conditions and optimal oscillation quantities at multistage oscillation machining are obtained by calculation based on the input information.

On the other hand, Japanese Patent Laid-Open No. 178731/1991 has disclosed an electric discharge machining apparatus in which a tool electrode shape sensor provided in a machining tank is used or tool electrode shape information in an NC program is used so that machining is performed while machining conditions optimal for the case where the state is replaced by a state of actual electric discharge machining are automatically selected.

In the electric discharge machining method and apparatus disclosed in Japanese Patent Laid-Open No. 218517/1990, there was a problem that it was necessary to generate a function for recognizing the area of machining and a machining condition corresponding to the machining area when the shape of machining was complex because the electric discharge machining apparatus could not recognize three-dimensional information of the tool electrode and the machining shape of the subject when the machining content was input.

On the other hand, in the electric discharge machining apparatus disclosed in Japanese Patent Laid-Open No. 178731/1991, graphic data of a tool electrode generated by CAD or the like is used for generating machining conditions. However, shape data original to the graphic data is not effectively used but only information of surface area per unit height of a tool electrode having a three-dimensional shape generated by CAD/CAM is used. Further, no disclosure has been made on the method, etc., for performing controlling over machining done by a complex-shape tool electrode, and for generating machining conditions.

DISCLOSURE OF THE INVENTION

The present invention is designed to solve the aforementioned problems and an object of the invention is to provide an electric discharge machining method and apparatus in which efficient machining can be performed even in the case where the shape of machining is complex.

The electric discharge machining method according to the invention is an electric discharge machining method for performing machining under a machining condition selected while making either of shape information of a tool electrode and shape information of a subject for machining correspond to machining condition data in a machining condition database, having: a first step of reading either of shape data of the tool electrode and machining shape data of the subject; a second step of extracting either of shape characteristic of the tool electrode and machining shape characteristic of the subject from the shape data; and a third step of performing machining under a machining condition selected while making either of the shape characteristic of the tool electrode and the machining shape characteristic of the subject correspond to machining condition data in the machining condition database.

Further, the electric discharge machining method according to the invention is an electric discharge machining method for performing machining under a machining condition selected while making either of shape information of a tool electrode and shape information of a subject for machining correspond to machining condition data in a machining condition database, having: a first step of reading either of shape data of the tool electrode and machining shape data of the subject; a second step of extracting a plurality of sections from the shape data; a third step of mesh-dividing the sections and giving mesh data of solidness or hollowness; a fourth step of extracting either of shape characteristic of the tool electrode and machining shape characteristic of the subject from the mesh data; and a fifth step of performing machining under a machining condition selected while making either of the shape characteristic of the tool electrode and the machining shape characteristic of the subject correspond to machining condition data in the machining condition database.

Further, in the electric discharge machining method according to the invention, the most frequent shape characteristic obtained in either of shape characteristic information of the tool electrode and machining shape characteristic information of the subject on the basis of the mesh data is recognized as either of shape characteristic of the tool electrode and machining shape characteristic of the subject.

The electric discharge machining apparatus according to the invention is an electric discharge machining apparatus having machining condition storage means including a machining condition database in which a plurality of pieces of machining condition data are stored, wherein the electric discharge machining apparatus further has: input means for reading either of shape data of a tool electrode and machining shape data of a subject for machining; shape computing means for extracting a plurality of sections from the shape data, mesh-dividing the sections into split elements, giving mesh data of solidness or hollowness to each of the split elements and extracting either of shape characteristic of the tool electrode and machining shape characteristic of the subject from the mesh data; and machining condition setting means for selecting a machining condition while making either of the shape characteristic of the tool electrode and the machining shape characteristic of the subject correspond to machining condition data in the machining condition database of the machining condition storage means.

Further, in the electric discharge machining apparatus according to the invention, the most frequent shape characteristic obtained in either of shape characteristic information of the tool electrode and machining shape characteristic information of the subject on the basis of the mesh data is recognized as either of shape characteristic of the tool electrode and machining shape characteristic of the subject.

Because the invention is configured as described above, machining shape characteristic can be extracted so that an appropriate machining condition can be set by use of more detailed shape information. Hence, there is an effect that more efficient machining can be performed even in the case where the machining shape is complex.

BEST MODE FOR CARRYING OUT THE INVENTION

Figure 1:
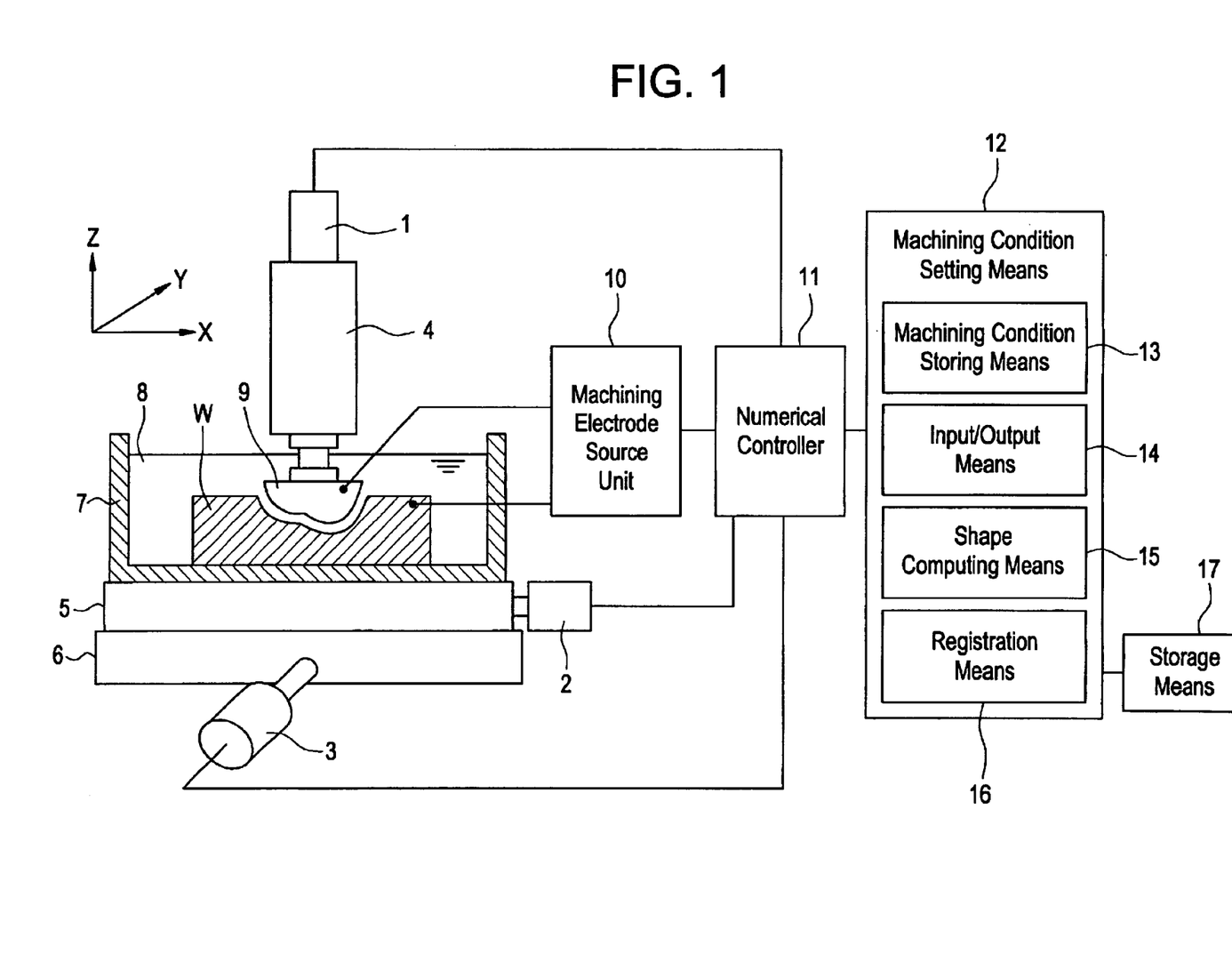
FIG. 1 is a configuration view showing an electric discharge machining apparatus according to an embodiment of the invention.

FIG. 1 is a configuration view showing an electric discharge machining apparatus according to an embodiment of the invention. In the drawing, the reference numerals 1, 2 and 3 designate motors; 4, a main shaft driven in a Z-axis direction by the motor 1; 5, a work table driven in an X-axis direction by the motor 2; 6, a work table driven in a Y-axis direction by the motor 3; 7, a machining tank placed on the work tables 5 and 6; 8, a machining liquid; 9, a tool electrode attached to the main shaft 4; 10, a machining electric source unit; 11, a numerical controller; 12, machining condition setting means; 13, machining condition storage means; 14, input-output means; 15, shape computing means; 16, registration means; 17, storage means; and W, a subject for machining. The machining electric source unit 10 supplies machining electric power between electrodes, that is, between the tool electrode 9 and the subject W so that the subject W is subjected to electric discharge machining while the tool electrode 9 and the subject W are moved relative to each other by the motors 1, 2 and 3 controlled to be driven by the numerical controller 11.

A machining condition database is stored in the machining condition storage means 13 in advance. An operating person inputs at least one of items for designating machining such as material of subject for machining, tool electrode material, scaling-down margin, machining accuracy, machining time, etc. from the registration means 16.

The input-output means 14 can fetch an NC program or the like from an external computing unit or the like through a recording medium, a communication cable, etc. The time required for machining, the machining conditions computed by the machining condition storage means 13, and so on, can be stored in the storage means 17 and can be output to an external computing unit or the like through a recording medium, a communication cable, etc.

The shape computing means 15 is means for fetching graphic data of the tool electrode 9 or the machining shape of the subject W input by the input-output means 14 and generated by CAD or the like, and for extracting characteristic shape elements from the machining shape. IGES which is a standard data format of CAD data, or another format can be used as the graphic data.

Figure 2:
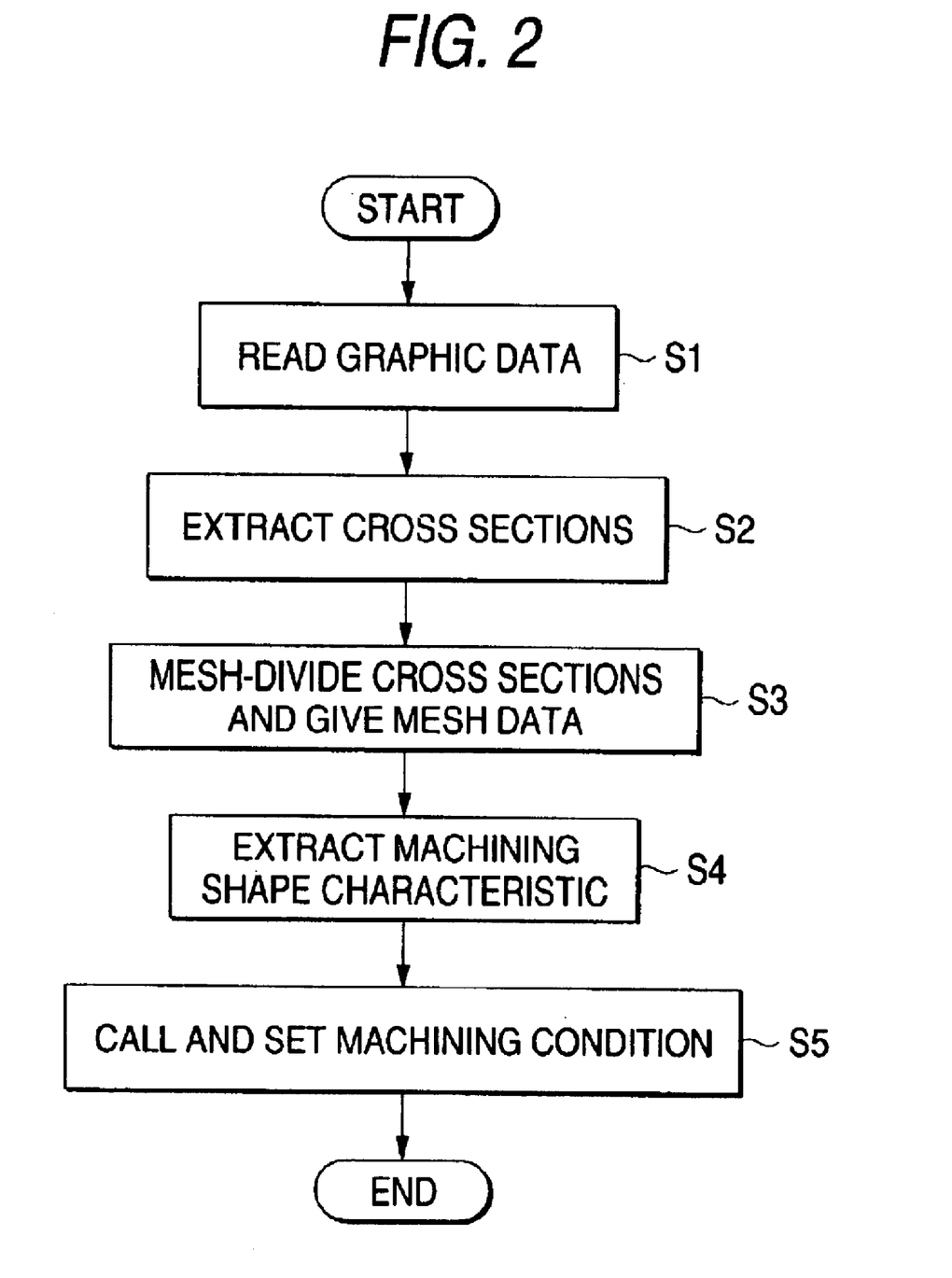
FIG. 2 is a flow chart showing a process for setting a machining condition by machining condition setting means.

FIG. 2 shows a process for setting machining conditions by the machining condition setting means 12. First, in the input-output means 14, shape data of the tool electrode 9 or machining shape data of the subject W is selected and the graphic data is read (S1). For example, when the tool electrode 9 is machined and molded into a convex shape, the subject W is machined into a concave shape. That is, by electric discharge machining with a hole shape portion of the tool electrode 9, a pillar shape is formed in the subject W, so that shape information for the tool electrode 9 is different from shape information for the machining shape of the subject W. In few cases, shape data of the machining shape is present in electric discharge machining, unlike NC data, or the like, for rough machining in cutting by a machine tool. The tool electrode is designed on the basis of a product shape in consideration of the parting line, the draft angle and the downsizing quantity and is used as shape data. Hence, in most cases, shape data of the tool electrode 9 is present. In most cases, the subject W and the tool electrode 9 can share information of shape data when information of a Z axis is inverted. The downsizing quantity is small, for example, to be not larger than 1 mm. Hence, shape elements smaller than the scale-down quantity has hardly influence on machining. Hence, there is no problem even in the case where shape data of the subject is generated on the basis of shape data of the tool electrode.

Figure 3A:
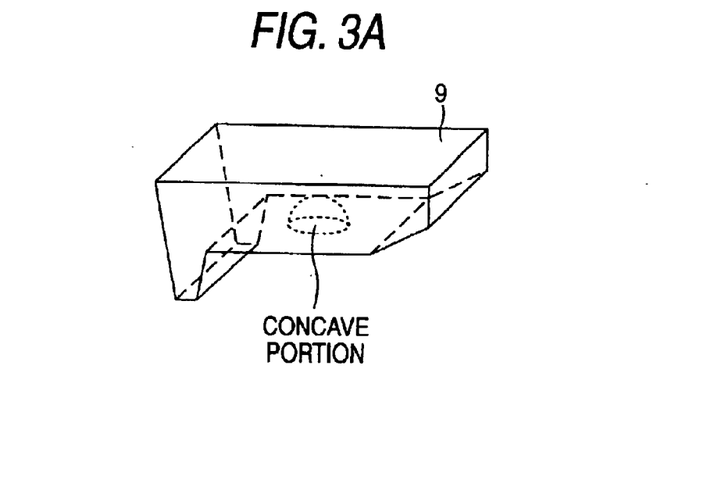
FIGS. 3A and 3B are perspective views showing an example of the shape of a tool electrode and the machining shape of a subject for machining.
Figure 3B:
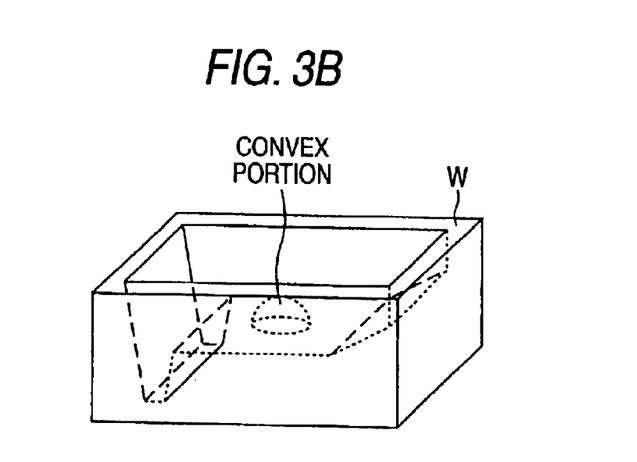
Figure 4:
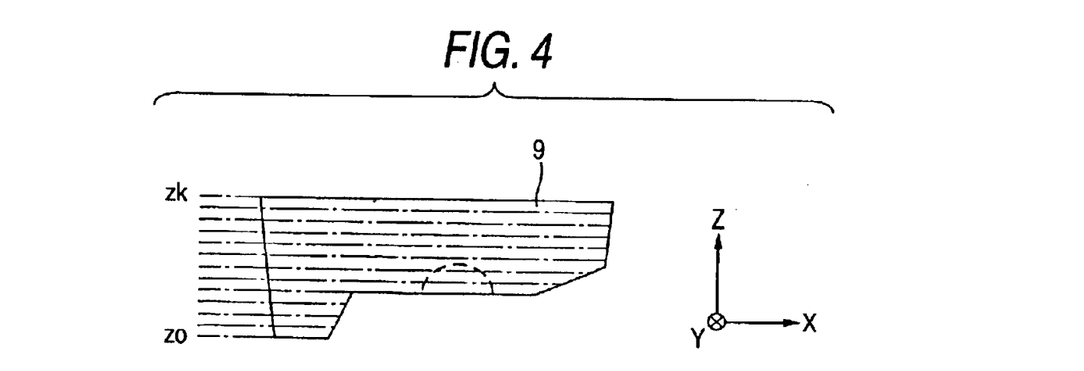
FIG. 4 is a view for explaining extraction of cross sections of the tool electrode.

FIG. 3A shows an example of the shape of the tool electrode 9. FIG. 3B shows an example of the machining shape of the subject W. Description will be made below on the case where the graphic data read in S1 is graphic data of the tool electrode 9. As shown in FIG. 4, in the tool electrode 9, k+1 cross sections corresponding to Z0 through Zk are extracted at intervals of a predetermined parting width in a Z-axis direction which is an advancing direction of machining (S2). Although the cross sections can be preferably calculated at intervals of required dimensional accuracy, the cross sections may be calculated at intervals of the downsizing quantity of the tool electrode or at intervals of about 1 mm because calculation is delayed if the divisor is too large.

Figure 5A:
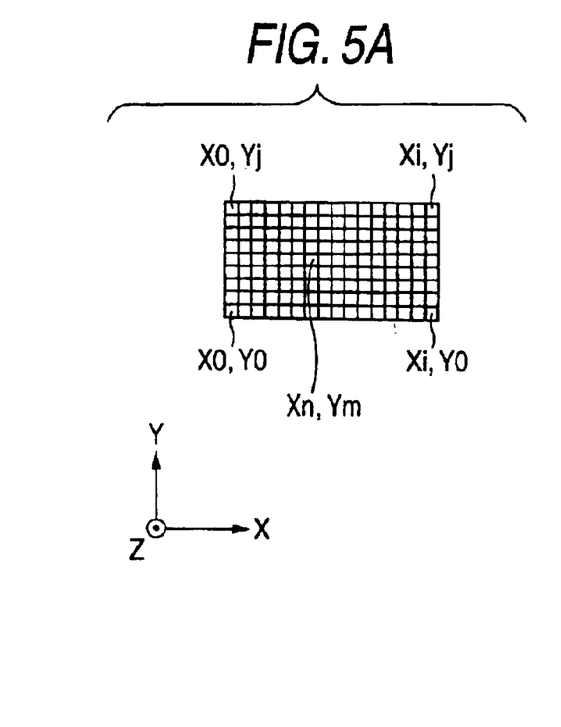
FIGS. 5A to 5C are views for explaining mesh-division.
Figure 5B:
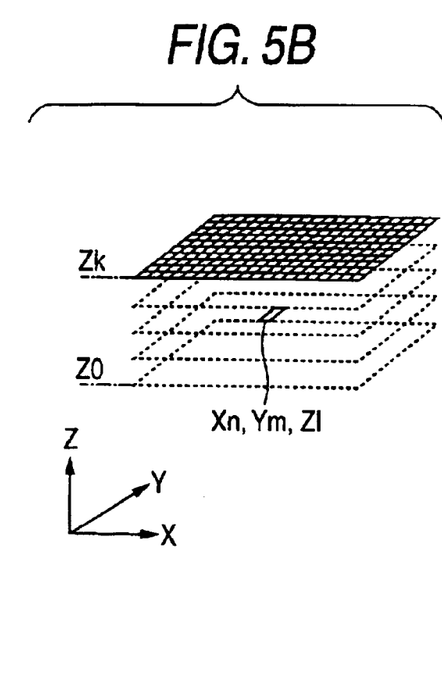
Figure 5C:
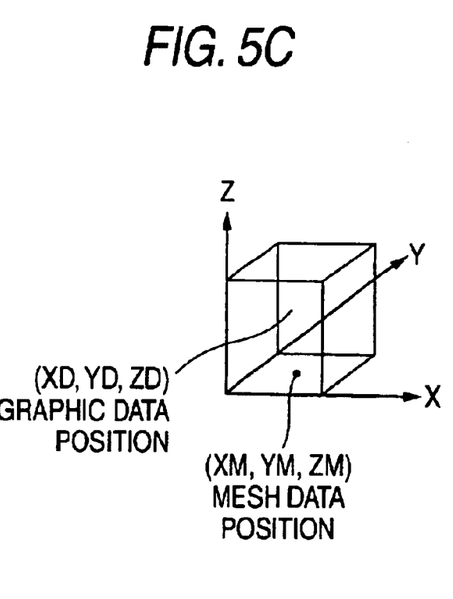

Then, the cross-sectional shape obtained in accordance with the machining direction in S2 is divided by small mesh. Although the mesh division width can be preferably set to be equal to required dimensional accuracy, the cross-sectional shape may be divided by the downsizing quantity of the tool electrode or by about 1 mm because calculation is delayed if the divisor is too large. For example, as shown in FIGS. 5A and 5B, the cross-sectional shape is divided into i+1 parts in an X-axis direction and into j+1 parts in a Y-axis direction. When the position coordinates of the graphic data are included in a mesh shape obtained by division, the position coordinates (XD, YD, ZD) of the graphic data are changed to the position coordinates (XM, YM, ZM) of the mesh data as shown in FIG. 5C. To indicate solidness, for example, information of "1" is given. On the other hand, in the case of hollowness, the position coordinates of the graphic data are not included in the mesh shape obtained by division. In this case, for example, information of "0" is given in order to indicate hollowness. In this manner, mesh data of respective split elements (Xn, Ym, Zl) (in which n, m and l are integers satisfying $0 \leq n \leq i$, $0 \leq m \leq j$, $0 \leq l \leq k$, respectively) can be obtained (S3).

Figure 6:
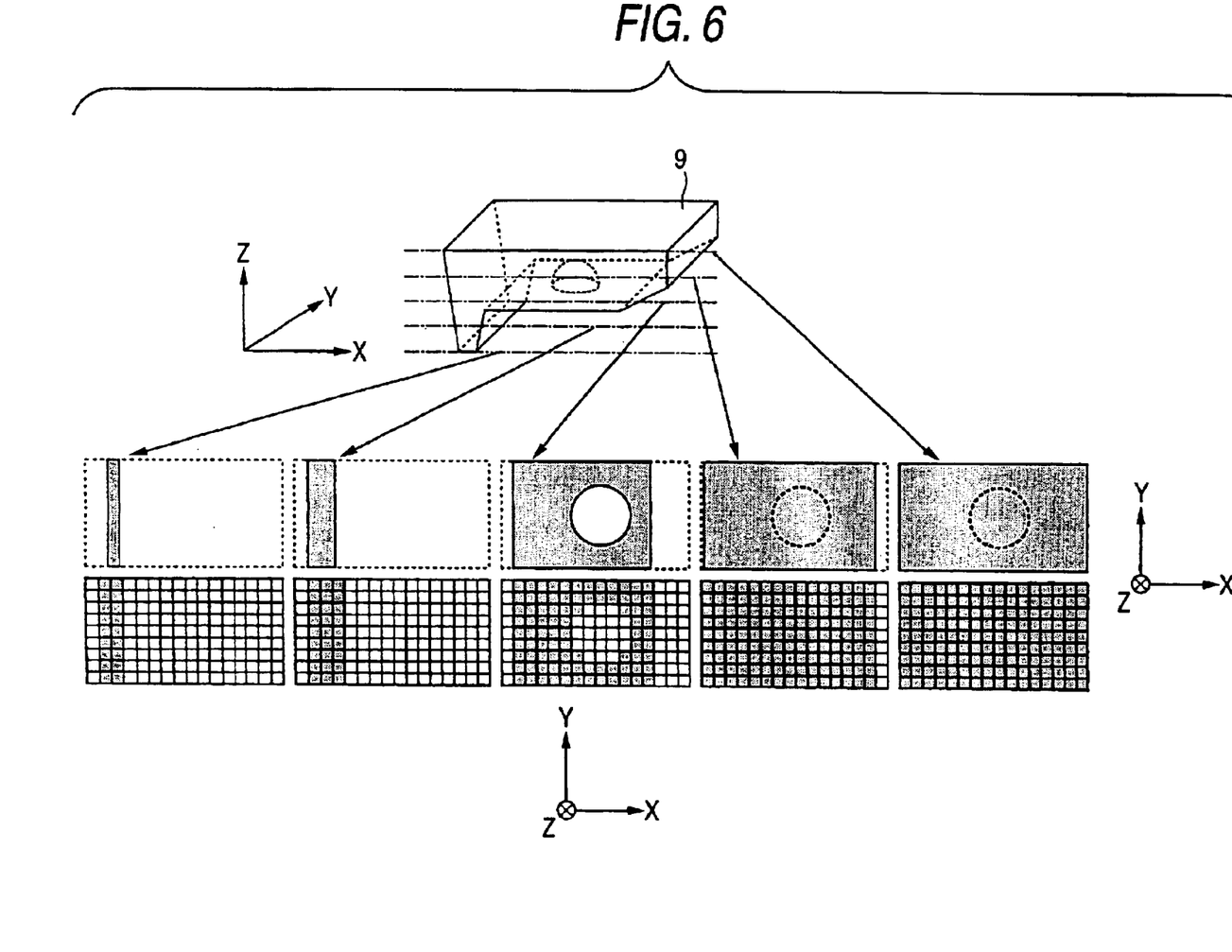
FIG. 6 is a view showing an example of mesh data of cross sections obtained by mesh-dividing the tool electrode shape.

On the other hand, when the graphic data is of a surface model, mesh data (for example, "1" or "0") can be given to each split element if model data conversion which is a known technique concerning CAD/CAM is made so that the graphic data can be used as data of a solid model. FIG. 6 shows an example of mesh data of cross sections obtained by mesh-dividing the shape of the tool electrode 9 in FIG. 3A in this manner.

Then, the characteristic of the machining shape is extracted by use of the mesh data of the respective split elements given in S3. As shown in the example of FIGS. 7A to 7D, a cross-sectional component and a longitudinal sectional component can be obtained on the basis of the mesh data of the respective split elements (Xn, Ym, Zl) (in which n, m and l are integers satisfying $0 \leq n \leq i$, $0 \leq m \leq j$, $0 \leq l \leq k$, respectively) extracted in S3.

A concave portion is the case where at least one mesh data "0" is present in the mesh shape of the cross-sectional component (X-Y plane) and where adjacent and continuous mesh data "0" are surrounded by mesh data "1". A convex portion is the case where at least one mesh data "1" is present in the mesh shape of the cross-sectional component (X-Y plane) and where adjacent and continuous mesh data "1" are surrounded by mesh data "0".

Figure 7A:
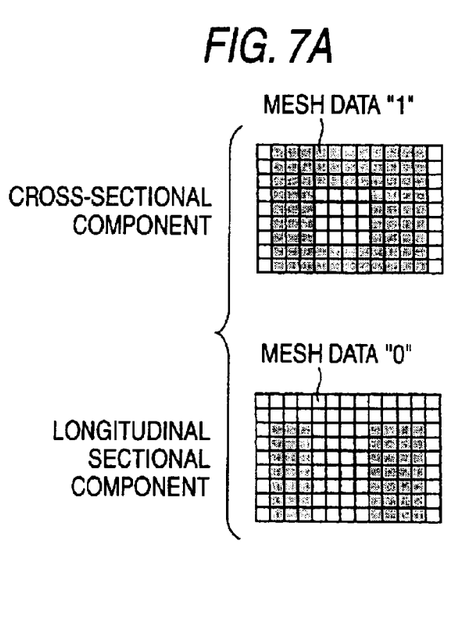
FIGS. 7A to 7D are explanatory views showing an example of extraction of machining shape characteristic from mesh data of respective split elements in a cross sectional component and a longitudinal sectional component.
Figure 7B:
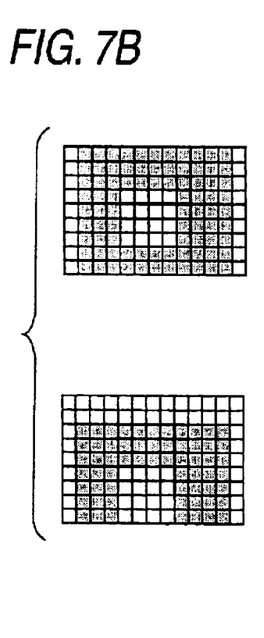

When a concave portion is detected, it can be found that a place where mesh data of k+1 cross sections (X-Y plane) of from Z0 to Zk are all "0" expresses a "hole shape" (FIG. 7A) and that a place where mesh data of at least one of k+1 cross sections (X-Y plane) of from Z0 to Zk is "1" expresses a "bag shape" (FIG. 7B).

After the shapes of concave portions are extracted throughout the whole shape, the number of concave portions is counted. When at least one concave portion is present, information of "concave portion present" is added to the shape information of the tool electrode. When a plurality of concave portions are present, numbers are assigned to the shapes of the concave portions and information of the characteristic of shape such as "bag shape", "hole shape", or the like, and information of the size of shape (such as the number of meshes) are given to the shape of each of the concave portions. On this occasion, order of priority is given in accordance with the size of the shape of each concave portion.

Figure 7C:
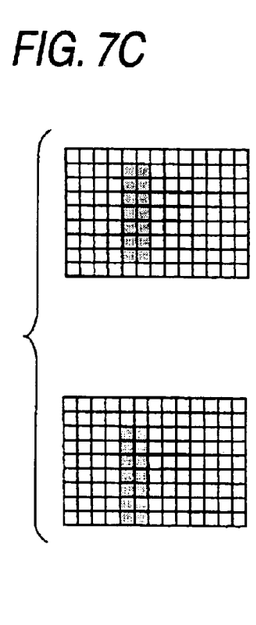
Figure 7D:
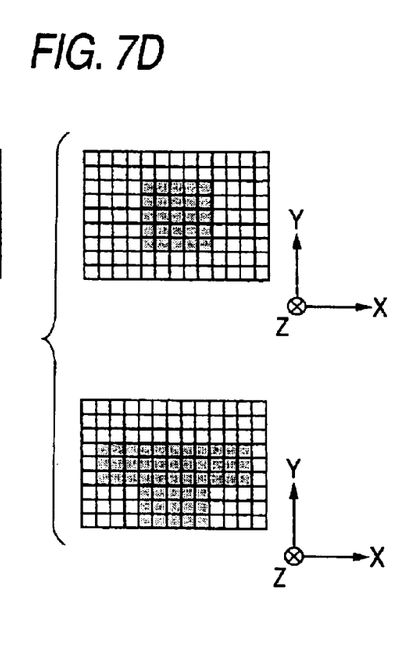

On the other hand, when a convex portion is detected, the characteristic of the tool electrode shape such as a rib shape shown in FIG. 7C or an area-change shape shown in FIG. 7D can be extracted.

Convex portions are extracted throughout the whole shape and the number of convex portions is counted in the same manner as in the case of shapes of concave portions. When at least one convex portion is present, information of "convex portion present" is added to the shape information of the tool electrode. When a plurality of convex portions are present, numbers are assigned to the shapes of the convex portions and information of the characteristic of shape such as "rib shape", "area-change shape", or the like, and information of the size of shape (such as the number of meshes) are given to the shape of each of the convex portions. On this occasion, order of priority is given in accordance with the size of the shape of each convex portion.

Generally, the tool electrode shape is constituted by various shape elements as described above. When the aforementioned combination of shape characteristics is complex, the most frequent shape characteristic obtained on the basis of shape characteristic information according to mesh data in consideration of the frequency (of the number corresponding to the shape characteristic allocated to the shape) and size (for example, in accordance with frequency×size) is recognized as the characteristic of the tool electrode shape (S4).

The S2 to S4 can be performed by the shape computing means 15 included in the machining condition setting means 12.

Machining conditions corresponding to the characteristic shape element, machining area, machining depth, etc., of the tool electrode (that is, machining shape) extracted in S4 are called from the machining condition database in the machining condition storage means 13 and set (S5). Machining conditions corresponding to characteristic shape elements can be experimentally determined and stored in the database of the machining condition storage means 13 in advance.

In this manner, when a characteristic machining shape is extracted and a machining condition adapted to the characteristic machining shape is selected, more efficient machining can be made because an appropriate machining condition can be set even in the case for a complex machining shape.

Industrial Applicability

As described above, the electric discharge machining method and apparatus according to the invention is adapted for use in electric discharge machining work.

What is claimed is:

1. An electric discharge machining method for performing machining under a machining condition selected while making either of shape information of a tool electrode and shape information of a subject for machining correspond to machining condition data in a machining condition database, characterized by comprising:

a first step of reading either of shape data of said tool electrode and machining shape data of said subject;

a second step of extracting either of shape characteristic of said tool electrode and machining shape characteristic of said subject from said shape data; and a third step of performing machining under a machining condition selected while making either of said shape characteristic of said tool electrode and said machining shape characteristic of said subject correspond to machining condition data in said machining condition database.

2. An electric discharge machining method for performing machining under a machining condition selected while making either of shape information of a tool electrode and shape information of a subject for machining correspond to machining condition data in a machining condition database, characterized by comprising:

a first step of reading either of shape data of said tool electrode and machining shape data of said subject;

a second step of extracting a plurality of sections from said shape data;

a third step of mesh-dividing said sections and giving mesh data of solidness or hollowness;

a fourth step of extracting either of shape characteristic of said tool electrode and machining shape characteristic of said subject from said mesh data; and a fifth step of performing machining under a machining condition selected while making either of said shape characteristic of said tool electrode and said machining shape characteristic of said subject correspond to machining condition data in said machining condition database.

3. An electric discharge machining method according to claim 2, characterized in that most frequent shape characteristic obtained in either of shape characteristic information of said tool electrode and machining shape characteristic information of said subject on the basis of said mesh data is recognized as either of shape characteristic of said tool electrode and machining shape characteristic of said subject.

4. An electric discharge machining apparatus comprising machining condition storage means including a machining condition database in which a plurality of pieces of machining condition data are stored, characterized in that said electric discharge machining apparatus further comprises:

input means for reading either of shape data of a tool electrode and machining shape data of a subject for machining;

shape computing means for extracting a plurality of sections from said shape data, mesh-dividing said sections into split elements, giving mesh data of solidness or hollowness to each of said split elements and extracting either of shape characteristic of said tool electrode and machining shape characteristic of said subject from said mesh data; and machining condition setting means for selecting a machining condition while making either of said shape characteristic of said tool electrode and said machining shape characteristic of said subject correspond to machining condition data in said machining condition database of said machining condition storage means.

5. An electric discharge machining apparatus according to claim 4, characterized in that most frequent shape characteristic obtained in either of shape characteristic information of said tool electrode and machining shape characteristic information of said subject on the basis of said mesh data is recognized as either of shape characteristic of said tool electrode and machining shape characteristic of said subject.

* * * * *